United States Patent [19]

Schlaikjer et al.

[11] Patent Number: 5,145,755
[45] Date of Patent: Sep. 8, 1992

[54] METHOD OF MAKING TETRACHLOROALUMINATE + SULFUR DIOXIDE ELECTROLYTES IN WHICH HYDROLYSIS PRODUCTS ARE REMOVED

[75] Inventors: Carl R. Schlaikjer, Concord, Mass.; Melinda D. Jones, Pawtucket, R.I.

[73] Assignee: The United States of America as represented by the Secretary of the Navy, Washington, D.C.

[21] Appl. No.: 751,851

[22] Filed: Aug. 29, 1991

[51] Int. Cl.$^5$ .............................................. H01M 6/14
[52] U.S. Cl. .................................... 429/196; 429/197
[58] Field of Search ................................. 429/196, 197

[56] References Cited

U.S. PATENT DOCUMENTS

| | | | |
|---|---|---|---|
| 3,493,433 | 2/1970 | Hoffmann | 429/196 |
| 3,998,660 | 12/1976 | Lieberman | 429/196 |
| 4,375,502 | 3/1983 | Gaband | 429/196 X |
| 4,513,067 | 4/1985 | Kuo et al. | 429/196 X |
| 4,891,281 | 1/1990 | Kuo et al. | 429/196 X |
| 4,925,753 | 5/1990 | Schlaikjer | 429/196 |
| 4,988,585 | 1/1991 | O'Hara et al. | 429/196 X |

OTHER PUBLICATIONS

Dey, A. N. et al., "Inorganic Electrolyte Rechargeable Li/SO$_2$ System", Power Sources Sym., Cherry Hill, N.J., proceedings, Electrochemical Society, May 1986, pp. 176–184.

Kuo et al., "Rechargeable Li/SO$_2$ System with Inorganic Electrolyte", Proc. Sympos. Lithium Batteries Electrochemical Society, 1986, pp. 414–437.

Primary Examiner—John S. Maples
Attorney, Agent, or Firm—William C. Townsend

[57] ABSTRACT

Method for making electrolytes for Li/metal tetrachoroaluminate.nSO$_2$/carbon rechargeable cells containing calcium or sodium tetrachloroaluminate, by treating the metal tetrachloroaluminate salt mixture with sulfuryl chloride to purify it of hydrolysis products, removing the sulfuryl chloride, and dissolving the mixture in sulfur dioxide.

17 Claims, 3 Drawing Sheets

METHOD OF MAKING TETRACHLOROALUMINATE + SULFUR DIOXIDE ELECTROLYTES IN WHICH HYDROLYSIS PRODUCTS ARE REMOVED

BACKGROUND OF THE INVENTION

This invention relates to lithium electrochemical power sources, and more particularly, to methods for making electrolytes for such power sources.

Electrolytes containing a mixture of tetrachloroaluminate salts dissolved in sulfur dioxide are especially useful for rechargeable cells in which the negative electrode is lithium metal and the positive electrode is a high surface area carbon. Lithium/metal tetrachloraluminate•nSO2/carbon rechargeable cells have been described in the patent and scientific literature, including Kuo et al U.S. Pat. No. 4,513,067 and the paper presented by A. N. Dey et al at the 32nd Power Sources Symposium at Cherry Hill New Jersey in May 1986 and reported in the Proceedings of the Electrochemical Society. The Kuo patent, for example, relates to batteries having an alkali or alkaline earth metal anode, a carbon cathode, and a sulfur dioxide electrolyte. Example 1 of the patent describes a basic battery including lithium tetrachloroaluminate dissolved in sulfur dioxide. Such cells typically contain pure lithium anodes, porous carbon cathodes, and lithium tetrachloroaluminate as the electrolyte salt dissolved in liquid sulfur dioxide in a molar ratio of $LiAlCl_4$ to $SO_2$ of 1 to 6. During discharge, the aluminum and $SO_2$ take part, producing a product that adheres strongly to the carbon cathode resulting in the electrolyte having lower aluminum concentration.

More recently, batteries having improved capacity, resistance to capacity fading, and lithium plating morphology, were obtained by increasing the concentration of aluminum in the electrolyte. The molar ratio of aluminum salt to sulfur dioxide was changed from 1 to 6 to 1 to 3. To prevent the electrolyt mixture from freezing, either calcium or sodium tetrachloroaluminate was mixed with the lithium tetrachloroaluminate.

While solving the freezing problem, the concentration of hydrolysis products (impurities containing hydrogen as the result of contact with water) also increased. These hydrolysis products were suspected of contributing to these cells' increased propensity for rapid and dangerous reactions and explosions during charging, as well as other difficulties including the growth of lithium dendrites which are responsible for the formation of short circuits during charge cycles. This moisture comes into the system primarily with one of the component salts, namely, aluminum chloride, in spite of attempts to purify it by distillation or sublimation prior to electrolyte preparation.

Schlaikjer, U.S. Pat. No. 4,925,753, addressed the problem of moisture and discloses a lithium tetrachloroaluminate cell containing calcium tetrachloroaluminate antifreeze that is characterized as substantially moisture free. In accordance with the method described in this patent, the lithium chloride and calcium chloride component salts are dried in vacuo for at least 16 hours at least 200° C., and the aluminum chloride is purified by distillation at atmospheric pressure from molten lithium tetrachloroaluminate in the presence of calcium turnings. This method was the best way applicants then knew to reduce the moisture content to a low level. For example, FIG. 1 hereof shows an infrared (IR) spectrum of $2LiCl•CaCl_2•4AlCl_3•12SO_2$, using a 10 mm pathlength type I quartz cell versus an identical empty cell, between 4000 and 2000 $cm^{-1}$. The aluminum chloride had been distilled from molten lithium tetrachloroaluminate in the presence of calcium turnings as described in the Schlaikjer patent. The salt was free of organic materials and iron, but was still only 98 weight percent pure, as determined by using argentimetric titration. The lithium and calcium chloride salts were reagent grade and had been dried in vacuo at 200° C. for at least 14 hours. The sulfur dioxide was Matheson reagent grade, with less than 50 ppm water. Nevertheless, the strong, broad absorption between 2.8 and 3.15 $\mu$ in FIG. 1 represents absorption caused by —OH stretching, believed to be present on the anion as $AlCl_3$—$OH^-$. Although 98% $AlCl_3$ represents "substantially moisture free" aluminum chloride, 2 weight per cent of water represents 13 mole per cent of the mixture with aluminum chloride. Still lower levels are desired for an electrolyte in a lithium cell. Accordingly, a main object of the invention is the provision of a process for preparing electrolytes that is a further improvement over the prior art.

SUMMARY OF THE INVENTION

The present invention provides an improved, more effective means of preparing solutions of tetrachloroaluminate salts in sulfur dioxide in which hydrolysis products are removed, not by treating the aluminum chloride separately, but rather, by treating the salts together as a mixture. In accordance with the invention, the mixed metal tetrachloroaluminate salts are treated with sulfuryl chloride to purify the mixture of hydrolysis products. The sulfuryl chloride is subsequently removed, and the mixture is then contacted with sulfur dioxide to complete formation of the electrolyte.

Lieberman, in U.S. Pat. No. 3,998,660 describes a method for preparing thionyl chloride electrolytes in which he started with a lithium tetrachloroaluminate + sulfuryl chloride electrolyte previously dried over lithium metal. He then added thionyl chloride (boiling point about 79° C.) solvent, followed by removal of the lower boiling (about 69° C.) sulfuryl chloride to produce a thionyl chloride electrolyte. He displaced the sulfuryl chloride with thionyl chloride and formed a thionyl chloride electrolyte, a different concept than the present invention which results in a sulfur dioxide electrolyte. Sulfur dioxide is a gas at ambient temperatures, boiling at a temperature (about −10° C.) that is far below sulfuryl chloride instead of above it as does thionyl chloride.

DETAILED DESCRIPTION

In accordance with the invention, a tetrachloroaluminate salt mixture containing an alkali metal tetrachloroaluminate (preferably lithium tetrachloroaluminate) and another alkali metal tetrachloroaluminate or an alkaline earth metal tetrachloroaluminate (preferably calcium or sodium tetrachloroaluminate) is contacted with sulfuryl chloride in stoichiometric excess of salt in the mixture, which is then heated at reflux to purify the mixture of hydrolysis products. The sulfuryl chloride is then removed, preferably first by distillation and then by melting the tetrachloroaluminate salt mixture. The purified mixture is then contacted by sulfur dioxide, which dissolves the salt mixture to complete the electrolyte.

In order to more fully illustrate the electrolytes purified in accordance with the invention, the following preparative and comparative use examples are presented.

COMPARATIVE EXAMPLES

Electrolyte solutions were prepared in a dryroom hood ($\leq 2\%$ relative humidity at 70° F.) first by weighing enough dried LiCl, either $CaCl_2$ or NaCl, and distilled $AlCl_3$ to prepare 100 ml of electrolyte, for example $2LiCl \bullet CaCl_2 \bullet 4AlCl_3 \bullet 12SO_2$, transferring the salts to a 250 ml roundbottom flask, and adding enough clean (free of hydrolysis products) sulfuryl chloride to bring the volume to about 150 ml. The mixture was heated and refluxed, using a Dewar condenser cooled with water ice, for about two hours, or until it no longer absorbed in the IR near 3300 cm$^{-1}$. Temperatures in the range of about 70° to 90° C. are suitable for this step. The major portion of the sulfuryl chloride was then removed by distillation. Removal of the sulfuryl chloride was then completed by melting the salt mixture in the Pyrex roundbottom flask at about 120° to 150° C. to drive off the remaining sulfuryl chloride. The salt mixture was subsequently allowed to cool to ambient temperatures.

Figure 1:
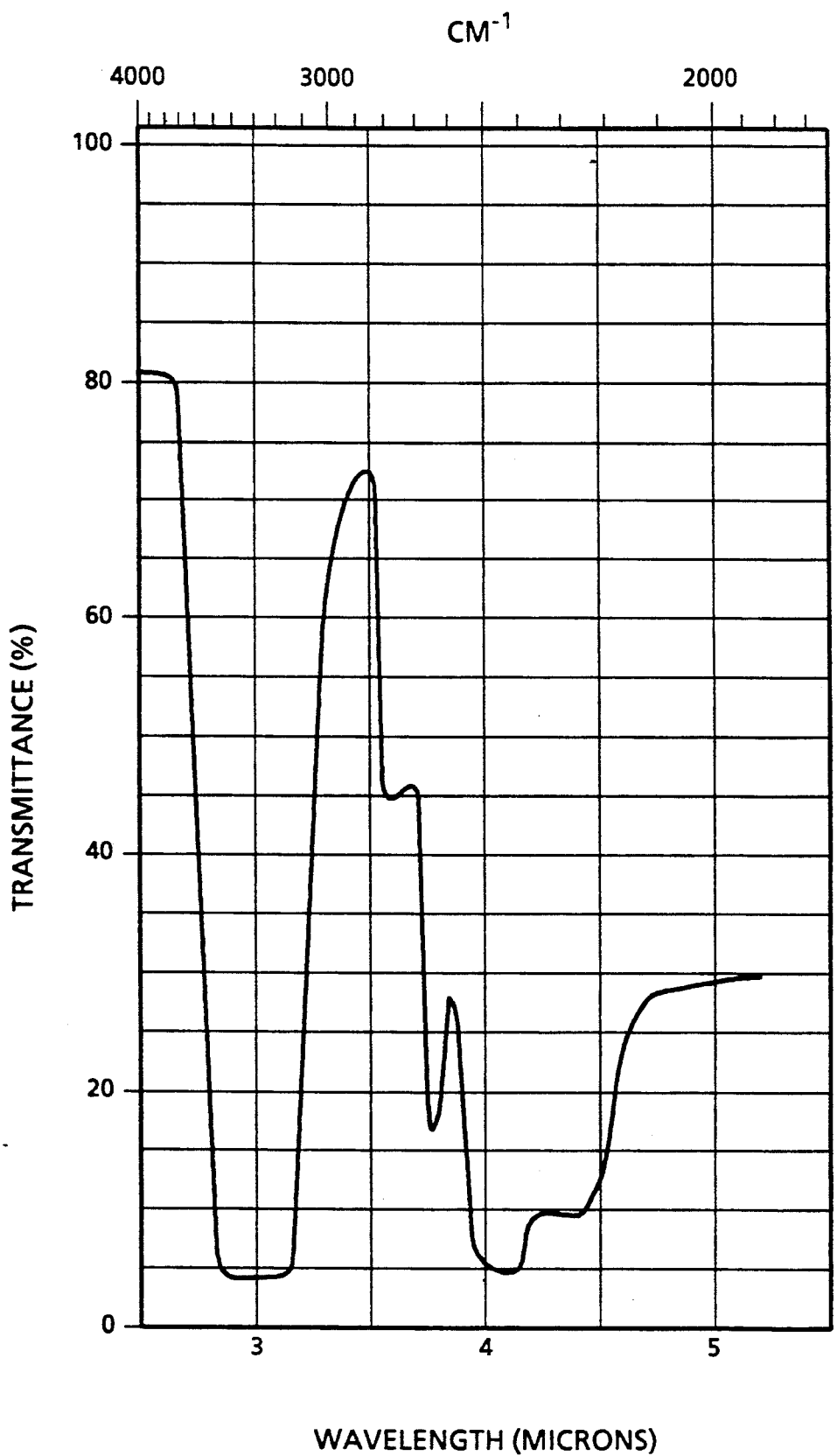
FIG. 1 shows an IR spectrum of $2LiCl•CaCl_2•4AlCl_3•12SO_2$ as discussed above.
Figure 2:
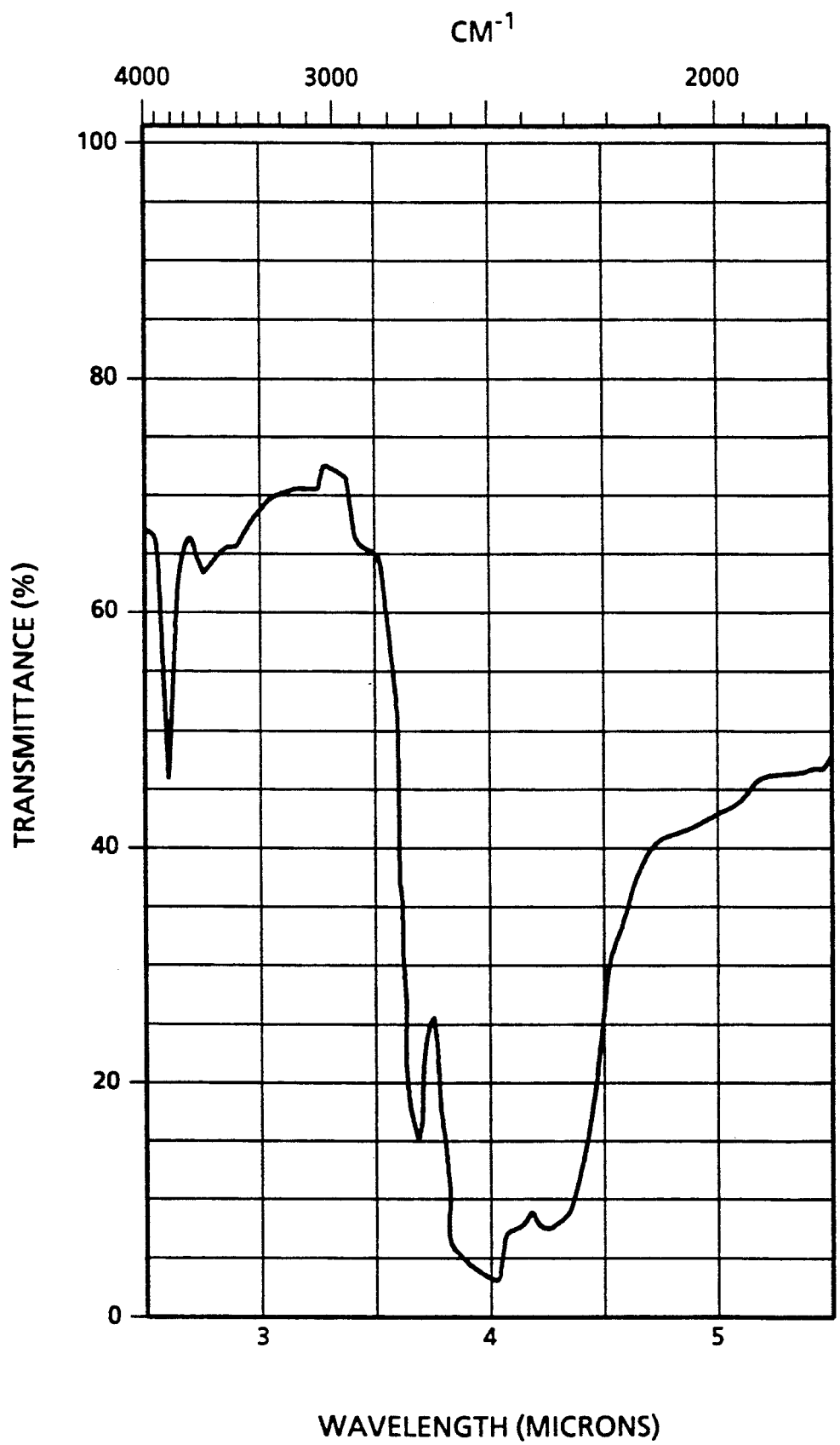
FIG. 2 shows the IR spectrum of $2LiCl•CaCl_2•4AlCl_3•10.1SO_2$ after purification by sulfuryl chloride in accordance with the present invention.

Sulfur dioxide gas was then led into the roundbottom flask using a hose which led to an oil filled bubbler to allow the regulation of the gas so that it was not added faster than it was being absorbed. The salt mixture quickly absorbed the gas, forming a light tan solution. A magnetic stirrer kept the solution in motion until the requisite weight of sulfur dioxide was added or until the mixture would no longer absorb the gas at atmospheric pressure and room temperature IR spectra showed that a sulfur dioxide solution of $2LiCl \bullet CaCl_2 \bullet 4AlCl_3 \bullet 10.1SO_2$ was essentially free of hydrolysis products and of sulfuryl chloride (FIG. 2). The solution was then allowed to settle, decanted at ambient temperature and pressure into a 100 ml Teflon Savillex pressure vessel, and capped. The pressure vessels contained fittings and valves so that the electrolyte could be led to the electrochemical cells without contacting the air.

COMPARATIVE EXAMPLES

In examples of the invention compared with the prior art, wound AA size prototype cells used as test vehicles had the following characteristics:
Case dimensions:
 $\frac{1}{2}''$ OD × 1 7/8''; 6.03 cm$^3$
Case polarity:
 Negative
Case and hardware materials:
 Stainless steel can and cover; cover welded; glass/metal compression type feedthrough seal; nickel screened positive; nickel tabbed negative
Negative electrode:
 3.5'' × 1.5'' × 0.016'' pure lithium (no alloys); capacity about 2.8 Ah
Positive electrode:
 3'' × 1.5'' × 0.024''; Ketjenblack/ 3% Teflon binder
Separators:
 Craneglass nonwoven Pyrex fabric, 0.005'' to 0.007'' thick
Electrolytes:
 Salts:
  $LiCl \bullet NaCl \bullet 2AlCl_3 \bullet 6SO_2$, prepared from reagent grade LiCl and NaCl dried at 200° C. in vacuo for at least 14 hours, $AlCl_3$ distilled from molten $LiAlCl_4$ in the presence of calcium turnings, and reagent grade $SO_2$ ($\leq 50$ ppm water)
  $LiCl \bullet NaCl \bullet 2AlCl_3 \bullet 6SO_2$ prepared from the same materials, but purified with sulfuryl chloride as explained in the preceding examples
 Solvent: sulfur dioxide only
Test regime:
 Discharge/charge time limits, 20 hrs/20 hrs (1 Ah)
 Discharge/charge potential limits, 2V/4V (100% depth of discharge)
 Discharge/charge constant current, 50 mA/50 mA
 Operating temperature range, 19° to 31° C.

Figure 3:
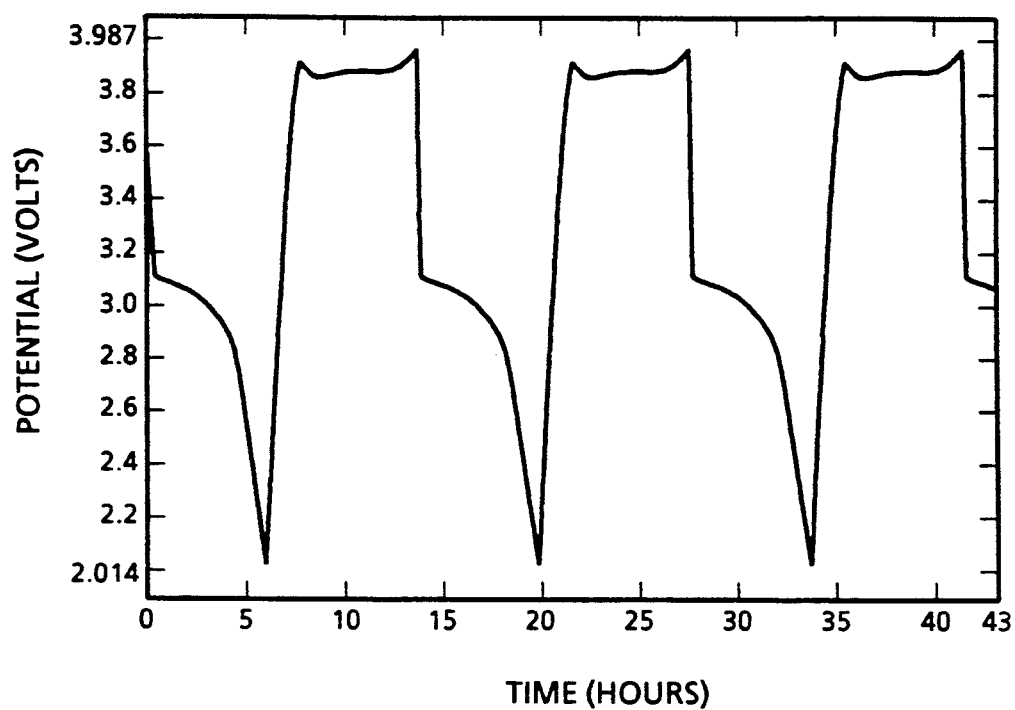
FIG. 3 shows the potential as a function of time during the first three discharge and charge cycles for a cell containing $LiCl•NaCl•2AlCl_3•6SO_2$ purified according to the invention.

An AA size cell containing unpurified $LiCl \bullet NaCl \bullet 2AlCl_3 \bullet 6SO_2$ was discharged and then charged according to the test regime described above. The cell short-circuited on the first charge cycle, apparently when lithium dendrites penetrated the open structured glass fiber separator. In contrast, FIG. 3 shows the potential as a function of time during the first three discharge and charge cycles for an identical cell containing $LiCl \bullet NaCl \bullet 2AlCl_3 \bullet 6SO_2$ purified according to this invention. The cell was successfully charged seventeen times without short-circuiting, even though the separator was open-structured glass fiber.

Separators normally used for lithium rechargeable cells are microporous to prevent lithium dendrites, which form unavoidably on the negative electrode during charge, from short-circuiting the cells. The example just described demonstrates that lithium plated during the charge cycles in cells with purified $LiCl \bullet NaCl \bullet 2AlCl_3 \bullet 6SO_2$ has a dramatically better morphology than lithium plated during the charging of cells with electrolytes prepared with an untreated salt mixture.

Figure 4:
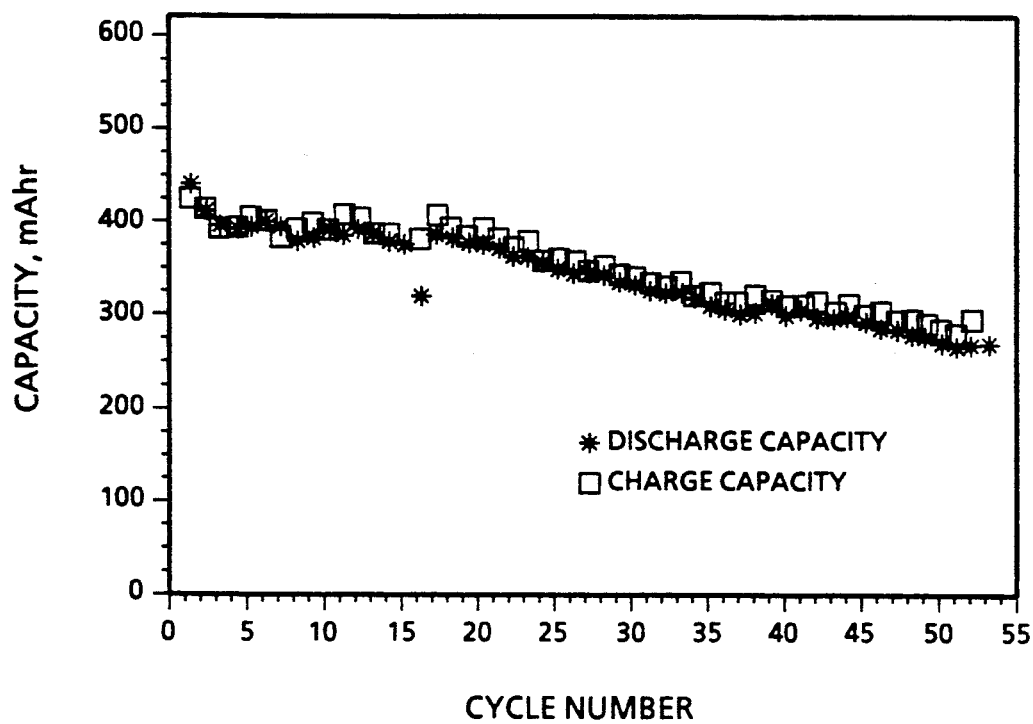
FIG. 4 shows the capacity versus the cycle number for a cell with $2LiCl•CaCl_2•4AlCl_3•10.1SO_2$ purified according to this invention.

The only polymer yet found which is chemically stable in $Li/LiAlCl_4 \bullet nSO_2$/carbon cells and capable of forming microporous films is ethylene/tetrafluoroethylene copolymer (Dupont Tefzel), an expensive material. Using electrolyte salt mixtures purified according to this invention makes possible the manufacture of cells which do not require the Tefzel polymer, but can function satisfactorily with only glass fabric as the separator. Another example of this is shown in FIG. 4, the capacity versus cycle number for an AA size cell having a glass fabric separator and containing $2LiCl \bullet CaCl_2 \bullet 4AlCl_3 \bullet 10.1SO_2$ that was purified according to the invention.

The examples given above are not to limit the scope of this invention. Variations of the electrolyte salt concentration or composition, including the ratio of the lithium to calcium or sodium in solution or whether other alkali or alkaline earths are present alone or mixed with each other, would obviously follow from the descriptions given. For salt mixtures containing calcium tetrachloroaluminate, it is preferred that the composition be $2LiCl \bullet CaCl_2 \bullet 4AlCl_3 \bullet nSO_2$ where n is in a range of from about 5 to about 15. For mixtures containing sodium tetrachloroaluminate, the preferred composition is $LiCl \bullet NaCl \bullet 2AlCl_3 \bullet nSO_2$ where n is in a range of from about 3 to about 9. The scope of the invention is defined by the appended claims.

We claim:

1. Process for making a sulfur dioxide electrolyte for a lithium electrochemical cell, comprising the steps of
providing a tetrachloroaluminate salt mixture containing an alkali metal tetrachloroaluminate and a member selected from the group consisting of another alkali metal tetrachloroaluminate and an alkaline earth metal tetrachloroaluminate,
adding sulfuryl chloride to the mixture,
heating the mixture to purify the mixture of hydrolysis products,
removing the sulfuryl chloride, and
adding sulfur dioxide to the mixture.

2. The process of claim 1, including the step of refluxing the mixture while heating.

3. The process of claim 2, in which the sulfuryl chloride is added in stoichiometric excess of salt in the mixture.

4. The process of claim 3, in which the sulfuryl chloride is removed at least in part by distillation.

5. The process of claim 4, in which removal of the sulfuryl chloride is completed by melting the salt mixture after distillation.

6. The process of claim 1, in which the alkali metal tetrachloroaluminate is lithium tetrachloroaluminate.

7. The process of claim 1, in which the selected member is calcium tetrachloroaluminate.

8. The process of claim 1, in which the selected member is sodium tetrachloroaluminate.

9. Process for making a sulfur dioxide electrolyte for a lithium rechargeable electrochemical cell, comprising the steps of
providing a tetrachloroaluminate salt mixture consisting essentially of lithium tetrachloroaluminate and a member selected from the group consisting of calcium tetrachloroaluminate and sodium tetrachloroaluminate,
contacting the mixture with a stoichiometric excess of sulfuryl chloride,
heating and refluxing the mixture until hydrolysis products are no longer present,
removing the sulfuryl chloride, and
dissolving the mixture in sulfur dioxide to form the electrolyte.

10. The process of claim 9, in which the selected member is calcium tetrachloroaluminate.

11. The process of claim 9, in which the selected member is sodium tetrachloroaluminate.

12. The process of claim 9, in which the sulfuryl chloride is removed in part by distillation and removal is completed by melting the salt mixture after distillation.

13. The process of claim 9, in which the electrolyte is $2LiCl \bullet CaCl_2 \bullet 4AlCl_3 \bullet nSO_2$ where n is from about 5 to about 15.

14. The process of claim 13, in which the electrolyte is $2LiCl \bullet CaCl_2 \bullet 4AlCl_3 \bullet 12SO_2$.

15. The process of claim 13, in which the electrolyte is $2LiCl \bullet CaCl_2 \bullet 4AlCl_3 \bullet 10.1SO_2$.

16. The process of claim 9, in which the electrolyte is $LiCl \bullet NaCl \bullet 2AlCl_3 \bullet nSO_2$ where n is from about 3 to about 9.

17. The process of claim 16, in which the electrolyte is $LiCl \bullet NaCl \bullet 2AlCl_3 \bullet 6SO_2$.

* * * * *